United States Patent
Bonfanti

(10) Patent No.: US 9,780,537 B2
(45) Date of Patent: Oct. 3, 2017

(54) GASKET ARRANGEMENT FOR WITHSTANDING INTERNAL ARC IN A SWITCHGEAR ENCLOSURE

(71) Applicant: ABB Technology Ltd., Zurich (CH)

(72) Inventor: Alessandro Bonfanti, Lake Mary, FL (US)

(73) Assignee: ABB Schweiz AG, Baden (CH)

( * ) Notice: Subject to any disclaimer, the term of this patent is extended or adjusted under 35 U.S.C. 154(b) by 22 days.

(21) Appl. No.: 14/818,450

(22) Filed: Aug. 5, 2015

(65) Prior Publication Data

US 2017/0040778 A1   Feb. 9, 2017

(51) Int. Cl.
*A47B 96/00* (2006.01)
*H02B 1/28* (2006.01)
*H02B 1/38* (2006.01)

(52) U.S. Cl.
CPC ............... *H02B 1/28* (2013.01); *H02B 1/38* (2013.01)

(58) Field of Classification Search
CPC .................................................. F25D 23/087
USPC ................................. 49/483.1, 489.1, 490.1
See application file for complete search history.

(56) References Cited

U.S. PATENT DOCUMENTS

| 4,691,970 A | 9/1987 | Neri |
| 4,765,677 A * | 8/1988 | Nagata ..................... B60J 10/82 296/216.09 |
| 6,746,092 B2 | 6/2004 | Leccia et al. |
| 6,971,322 B2 | 12/2005 | DuBois et al. |
| 7,558,052 B1 | 7/2009 | Coomer et al. |
| 7,871,137 B2 | 1/2011 | Schulz et al. |
| 8,960,815 B2 | 2/2015 | Karandikar et al. |
| 2015/0075080 A1 | 3/2015 | Ellingson |

OTHER PUBLICATIONS

Video accessible at http://www.youtube.com/watch?v=2n1InkQCG00, published on Jul. 23, 2014.
International Search Report & Written Opinion in PCT/EP2016/067929 dated Sep. 2, 2016.

* cited by examiner

*Primary Examiner* — Matthew Ing
(74) *Attorney, Agent, or Firm* — Manelli Selter PLLC; Edward J. Stemberger

(57) ABSTRACT

A switchgear enclosure has a case with a front face that surrounds an opening in the case. A flange extends from the front face and has a first surface adjacent to the opening and a second, opposing surface. At least the second surface is disposed transversely with respect to the front face. A door has a door bracket. A gasket is coupled the door bracket and forms an endless loop sized larger than a size of the opening in the case. The gasket has a seal portion. When the door is closed, the seal portion compresses against the second surface of the flange to provide a seal around the opening, and in the event of an arc in the case causing pressure to be exerted on the door, the gasket moves with the door, with the seal portion sliding along the second surface, maintaining the seal around the opening.

13 Claims, 5 Drawing Sheets

GASKET ARRANGEMENT FOR WITHSTANDING INTERNAL ARC IN A SWITCHGEAR ENCLOSURE

FIELD

The invention relates to an arc resistant metal enclosure for a switchgear and, more particularly, to a switchgear enclosure having a door with a gasket constructed and arranged to provide sealing with respect to an enclosure case, in a lateral manner.

BACKGROUND

A conventional switchgear enclosure for housing a circuit breaker has a door with a front-arranged gasket, such as that disclosed U.S. Pat. No. 8,960,815 B2, the content of which is hereby incorporated by reference into this specification. FIG. 1 shows an example of such a gasket 10 mounted to a door 12 of a switchgear enclosure so that when the door is closed, the gasket surrounds a periphery of an opening in the enclosure case so as to seal the case. As shown in FIG. 2, a door bracket 14 is mounted to the door 12 and the gasket 10 is mounted to the bracket 14. A compressible seal portion 16 of the gasket 10 is adjacent to an outer, front face 18 of the enclosure case 20 of a switchgear enclosure, generally indicated at 27. The front face 18 surrounds the opening (not shown) in the case 20. Thus, when the door is closed, the seal portion 16 is compressed against the front face 18 to seal the case 20. It is noted that the seal portion 16 is shown in an uncompressed state in FIG. 2, to show the gasket shape. The conventional gasket 10 is considered to be a front-sealing arrangement since seal portion 16 engages the front face 18 of the case 20, generally along an axis A that extends through the door 12 and the case 20.

The conventional front-sealing gasket 10 of FIGS. 1 and 2 can be affected by the deformation of the case 20 when the case and gasket are subjected to pressure caused by an internal arc. Thus, the gasket 10 can fail to seal the case 20 under such pressure. In addition, currently it is necessary to build a specific case 20 and increase its rigidity for every increase step of rating circuit breaker parameters (e.g., from 31.5 kA to 40 kA to 50 kA to 63 kA).

There is a need for a door suitable for various rated enclosures of switchgear that can withstand pressures caused by an internal arc and also a need for a gasket, between the door and the enclosure case, which remains sealed even when the enclosure door is moved by the pressure wave generated by the internal arc.

SUMMARY

An object of the invention is to fulfill the needs referred to above. In accordance with the principles of an embodiment, this objective is obtained by providing a switchgear enclosure having a case with a front face that surrounds an opening in the case. The opening communicates with an interior of the case. A flange extends from the front face and the flange has a first surface generally adjacent to the opening and a second, opposing surface. At least the second surface is disposed transversely with respect to the front face. A door is movable between open and closed positions with respect to the case so as to open or close the opening in the case. The door has a door bracket. A gasket is coupled to a portion of the door bracket so as to form an endless loop sized larger than a size of the opening in the case. The gasket has a seal portion. When the door is in the closed position, the seal portion is constructed and arranged to compress against the second surface of the flange so as to provide a seal around the opening, and in the event of an arc in the interior of the case causing pressure to be exerted on the door, the gasket is constructed and arranged to move with the door with the seal portion sliding along the second surface, maintaining the seal around the opening.

In accordance with another aspect of a disclosed embodiment, a method maintains a seal on a switchgear enclosure upon an internal arc event. The switchgear enclosure has a case with a front face that surrounds an opening in the case. The opening communicates with an interior of the case. The enclosure has a door for closing the opening. The method provides a flange extending from the front face. The flange has a first surface generally adjacent to the opening and a second, opposing surface, with at least the second surface being disposed transversely with respect to the front face. A gasket is coupled to the door so as to form an endless loop sized larger than a size of the opening in the case. The gasket has a seal portion. When the door is in the closed position, the seal portion is permitted to compress against the second surface of the flange so as to provide a seal around the opening. In the event of an arc in the interior of the case causing pressure to be exerted on the door and causing the gasket to move with the door, the seal portion is permitted to slide along the second surface, maintaining the seal around the opening.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 3:
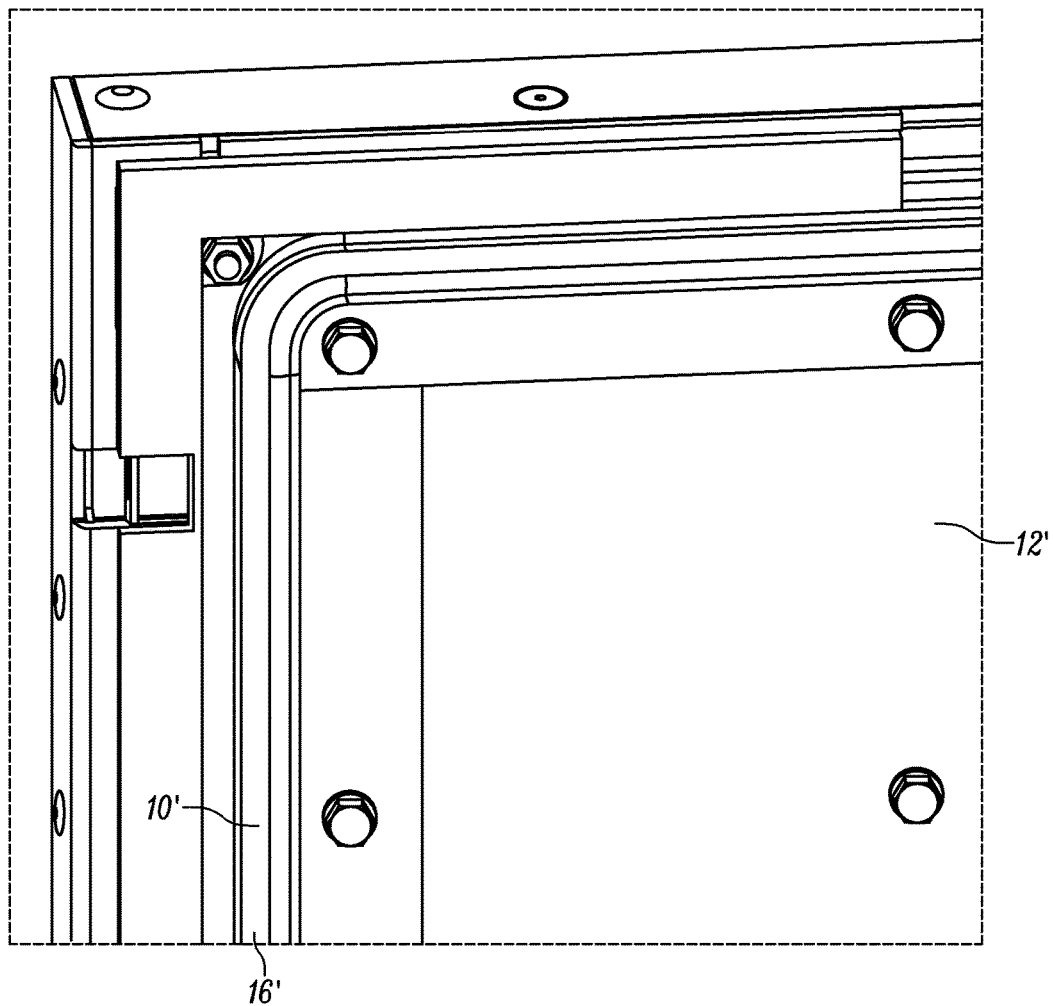
FIG. 3 is a partial rear view of a door of switchgear enclosure of an embodiment shown with a gasket mounted to the door.

With reference to FIG. 3, a partial view of a door 12' for a case 20' (FIG. 4) of a switchgear enclosure is shown in accordance with an embodiment. The door 12' includes an elastomer gasket 10' coupled to a door bracket 14' (FIG. 5). The gasket 10' is generally in the form of a rectangular endless loop on the interior side of the door 12'. The gasket 10' includes a compressible seal portion 16' that is preferably a hollow, tubular member coupled with a mounting portion 17 of the gasket 10'.

Figure 4:
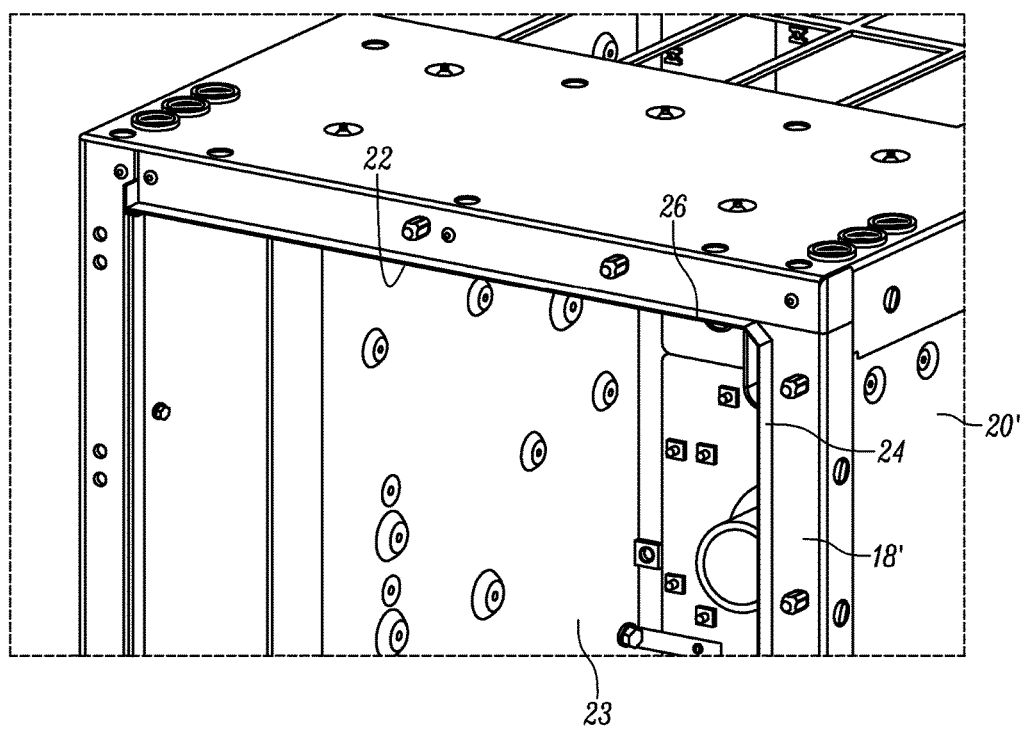
FIG. 4 is a partial view of a case of a switchgear enclosure of an embodiment having a flange extending from a face thereof for engaging the gasket of the door of FIG. 3.
Figure 5:
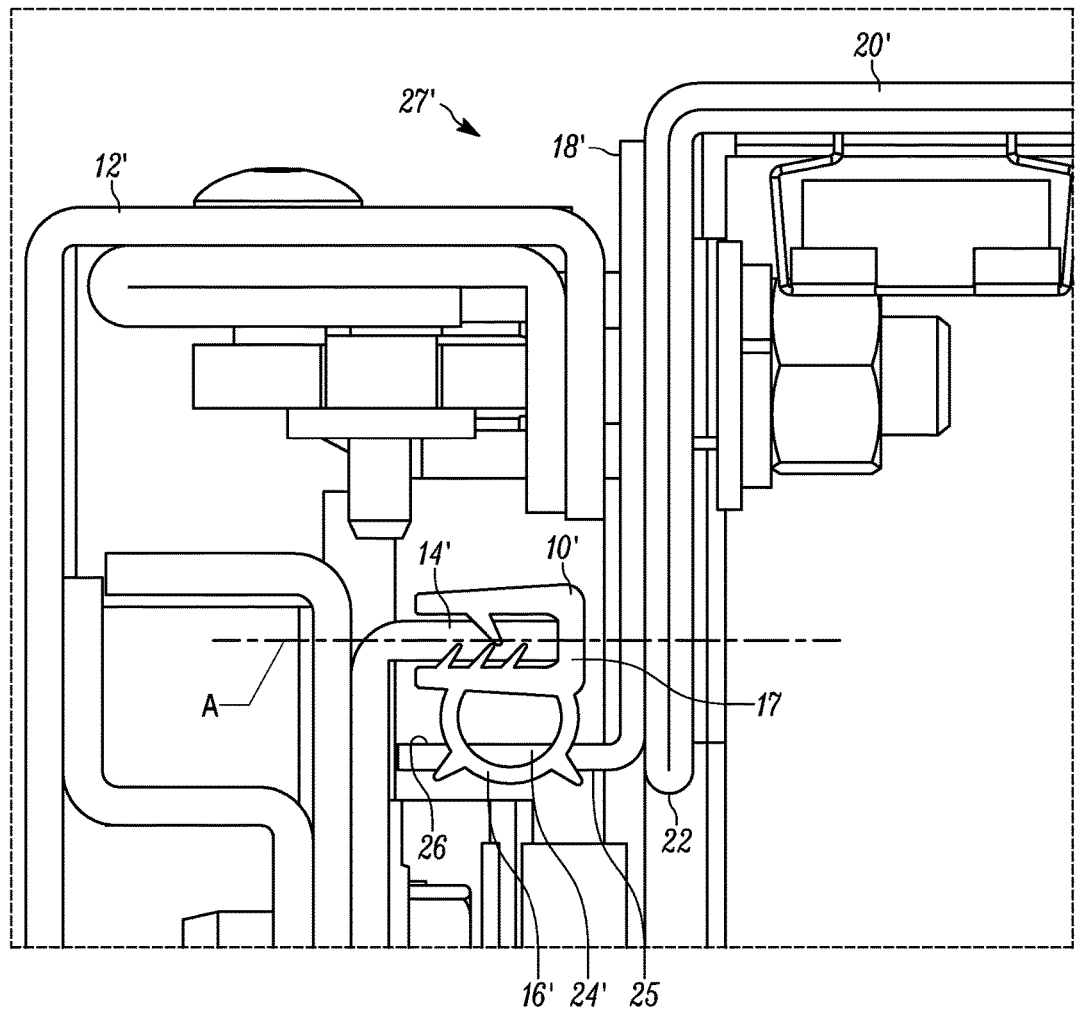
FIG. 5 is a partial side view of a switchgear enclosure of an embodiment showing the gasket of the door of FIG. 3 engaging the flange of the case of FIG. 4.

With reference to FIG. 4, in accordance with the embodiment, the case 20' includes the conventional opening 22 in communication with an interior 23 of the case 20'. The endless loop of the gasket 10' is sized so as to be larger than the opening 22 in the case 20'. The case 20' and the interior 23 are constructed and arranged to receive switchgear, such as a circuit breaker (not shown). The case 20' includes an outer, front face 18' that surrounds the opening 22. A flange 24 extends outwardly from the front face 18'. The flange 24 surrounds the entire periphery of the opening 22, defining a labyrinth and is the outermost part of the case 20' at the front end thereof (e.g., nothing extends beyond the flange 24 at the front of the case 20'). The flange 24 is preferably sheet metal and can be made integral or can be coupled to the front face 18. The flange 24 has an inwardly facing first planar surface 25 adjacent to the opening 22 and an opposing outwardly facing second planar surface 26. Surfaces 25 and 26 are disposed transversely with respect to the front face 18'.

With reference to FIG. 5, the door 12' is connected by hinges (not shown) to the case 20' to define the switchgear enclosure, generally indicated at 27. The door 12' is thus constructed and arranged to be movable to open or close the opening 22 in the case 20'. When the door 12' is closed and latched with respect to the case 20', the opening 22 is closed and the gasket 10' provides a seal sufficient to prevent gases from escaping during an arc fault. In particular, the seal portion 16 of the gasket 10' is compressed against the planar surface 26 of the flange 24 so as to provide a seal around the opening 22. It is noted that the seal portion 16' is shown in an uncompressed state in FIG. 5, to show the gasket shape. Thus, instead of engaging with the front face 18' (along axis A as in FIG. 2), in the embodiment, the compressible seal portion 16' engages the outwardly facing planar surface 26 of the flange 24. As a result, when an arc occurs in the case 20' and pressure causes the door 12' to move, the gasket 10' moves together with the door 12' (in the direction along axis A) with the seal portion 16' sliding along the surface 26 and thus, maintaining the seal around the opening 22. Also, since the seal portion 16' is located on the outside of the flange 24, it is not directly exposed to the pressure inside the case 20'.

Figure 1:
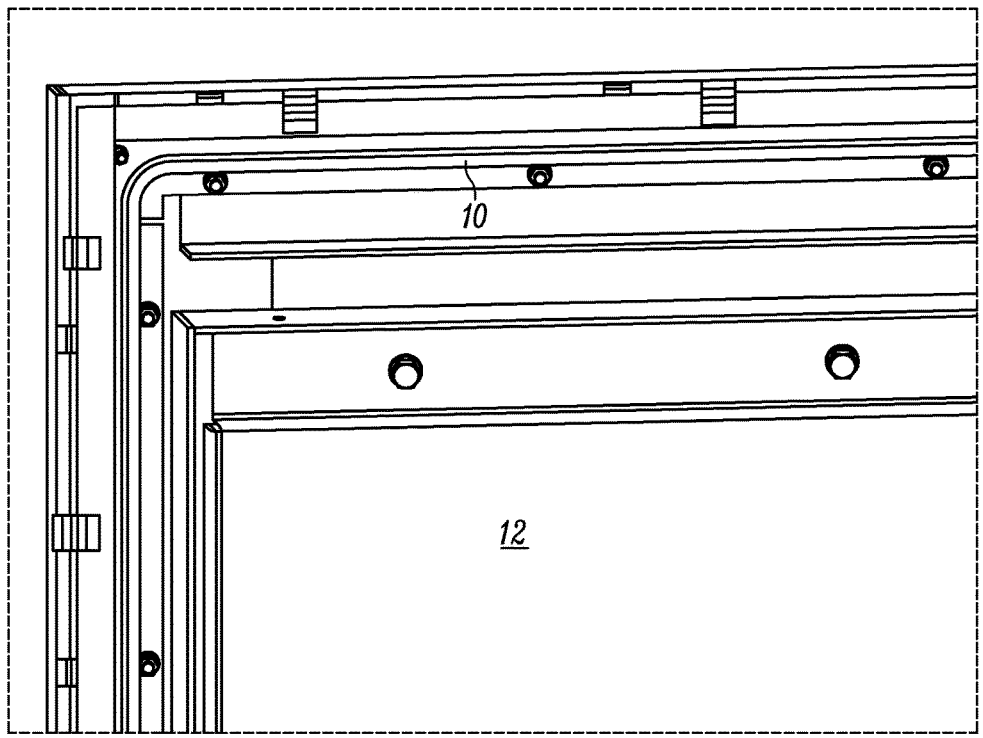
FIG. 1 is a partial rear view of a conventional door of switchgear enclosure shown with a conventional gasket mounted to the door.
Figure 2:
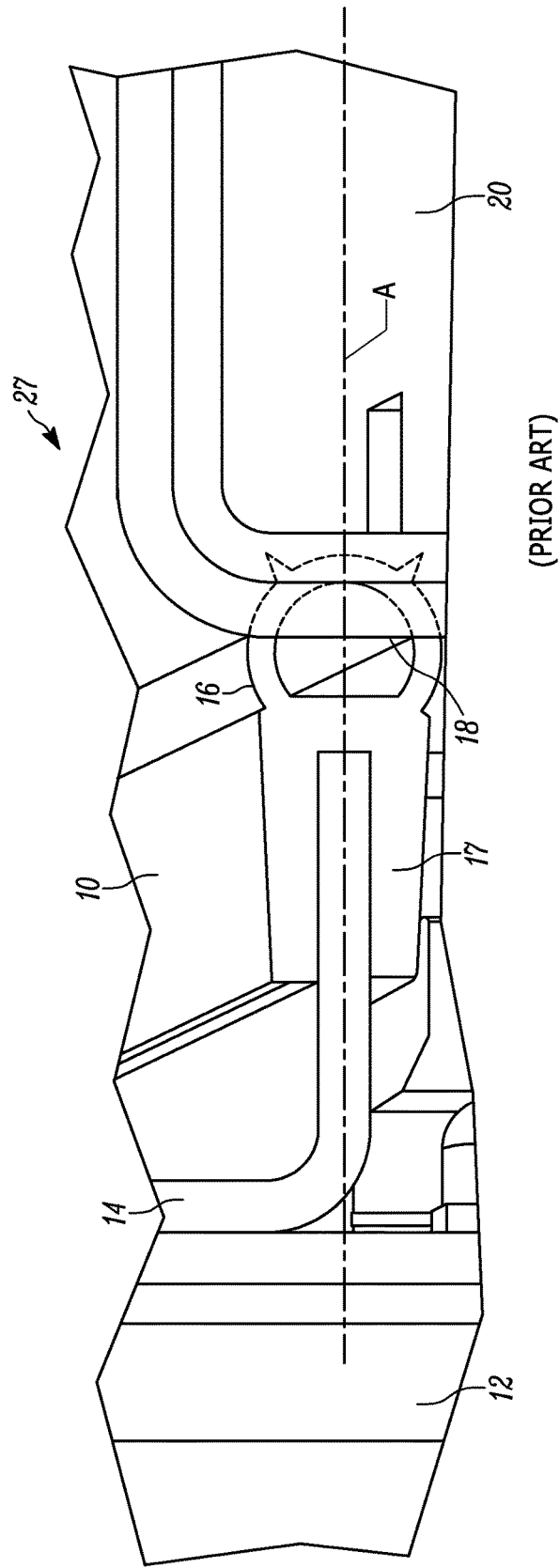
FIG. 2 is a view of the gasket of FIG. 1 engaged with a front face of a case of a switchgear enclosure.

As shown in FIG. 5, it is noted that the portion of the door bracket 14' that receives the mounting portion 17 of the gasket 10' is disposed generally parallel with the flange 24 of the case 20', with the seal portion 16' being disposed transversely with respect to both the flange 24 and the door bracket 14' (instead of being aligned with the axis A of bracket 14 as in FIG. 2).

The gasket 10' and flange 24 sealing arrangement enables lighter, less rigid doors to be used, requires less force for closing of the door and pressing the gasket, and uses the flexibility of the metal case and door for absorbing the energy generated by the arc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A switchgear enclosure comprising:
    a case having a front face that surrounds an opening in the case, the opening communicating with an interior of the case, a flange extending from the front face, the flange having a first surface generally adjacent to the opening and a second, opposing surface, with at least the second surface being disposed transversely with respect to the front face, and
    a door constructed and arranged to be movable between open and closed positions with respect to the case so as to open or close the opening in the case, the door having a door bracket,
    a gasket coupled to a portion of the door bracket so as to form an endless loop sized larger than a size of the opening in the case, the gasket having a seal portion,
    wherein, when the door is in the closed position, the seal portion is constructed and arranged to compress against the second surface of the flange so as to provide a seal around the opening, and in the event of an arc in the case causing pressure to be exerted on the door, the gasket is constructed and arranged to move with the door with the seal portion sliding along the second surface, maintaining the seal around the opening.

2. The switchgear enclosure of claim 1, wherein the seal portion is a hollow, tubular member.

3. The switchgear enclosure of claim 1, wherein the second surface of the flange is a planar surface.

4. The switchgear enclosure of claim 1, wherein the flange defines an outermost part of the case at a front portion thereof.

5. The switchgear enclosure of claim 1, wherein the portion of the door bracket to which the gasket is coupled is disposed generally parallel with the flange of the case.

6. The switchgear enclosure of claim 5, wherein the gasket includes a mounting portion coupled with the portion of the door bracket, and wherein the seal portion is coupled to a side of the mounting portion and is disposed generally transversely with respect to both the flange and the portion of the door bracket.

7. The switchgear enclosure of claim 1, wherein the case and interior thereof are constructed and arranged to receive a circuit breaker.

8. A method of maintaining a seal on a switchgear enclosure upon an internal arc event, the switchgear enclosure having a case with a front face that surrounds an opening in the case, the opening communicating with an interior of the case, the enclosure having a door for closing the opening, the method comprising the steps of:
    providing a flange extending from the front face, the flange having a first surface generally adjacent to the opening and a second, opposing surface, with at least the second surface being disposed transversely with respect to the front face, and
    providing a gasket coupled to the door so as to form an endless loop sized larger than a size of the opening in the case, the gasket having a seal portion,
        when the door is moved to the closed position, permitting the seal portion to compress against the second surface of the flange so as to provide a seal around the opening, and
        in the event of an arc in the interior of the case causing pressure to be exerted on the door causing the gasket to move with the door, permitting the seal portion to slide along the second surface, maintaining the seal around the opening.

9. The method of claim 8, wherein the step of providing the gasket provides the seal portion as a hollow, tubular member.

10. The method of claim 8, wherein the step of providing the flange provides the second surface as a planar surface.

11. The method of claim 8, wherein the step of providing the flange defines the flange as an outermost part of the case at a front portion thereof.

12. The method of claim 8, wherein step of providing the gasket includes mounding the gasket on a portion of a door bracket with the portion of the door bracket disposed generally parallel with the flange of the case.

13. The method of claim 12, wherein the step of providing the gasket provides the gasket with a mounting portion coupled with the portion of the door bracket, and wherein the seal portion is coupled to a side of the mounting portion and is disposed generally transversely with respect to both the flange and portion of the door bracket.

* * * * *